United States Patent
Cooper et al.

(10) Patent No.: US 7,971,081 B2
(45) Date of Patent: Jun. 28, 2011

(54) SYSTEM AND METHOD FOR FAST PLATFORM HIBERNATE AND RESUME

(75) Inventors: Barnes Cooper, Tigard, OR (US); Faraz A. Siddiqi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 11/965,948

(22) Filed: Dec. 28, 2007

(65) Prior Publication Data

US 2009/0172439 A1 Jul. 2, 2009

(51) Int. Cl.
*G06F 1/26* (2006.01)
*G06F 1/32* (2006.01)

(52) U.S. Cl. ........ 713/320; 713/300; 713/324; 712/228; 365/228

(58) Field of Classification Search .................. 713/300, 713/320, 324; 712/228; 365/228
See application file for complete search history.

(56) References Cited

U.S. PATENT DOCUMENTS

| | | | | |
|---|---|---|---|---|
| 6,131,166 | A * | 10/2000 | Wong-Insley | ................ 713/300 |
| 6,901,298 | B1 * | 5/2005 | Govindaraj et al. | ............ 700/21 |
| 6,968,469 | B1 * | 11/2005 | Fleischmann et al. | ........ 713/324 |
| 7,100,037 | B2 | 8/2006 | Cooper | |
| 7,152,169 | B2 | 12/2006 | Cooper et al. | |
| 7,210,045 | B2 * | 4/2007 | Dunstan | ........................ 713/300 |
| 7,293,183 | B2 * | 11/2007 | Lee et al. | ...................... 713/320 |
| 7,310,725 | B2 | 12/2007 | Zimmer et al. | |
| 7,725,746 | B2 * | 5/2010 | Lee et al. | ...................... 713/320 |
| 7,730,330 | B1 * | 6/2010 | Fleischmann et al. | ........ 713/300 |
| 2003/0233591 | A1 * | 12/2003 | Chiteboun et al. | ............ 713/300 |
| 2004/0003223 | A1 | 1/2004 | Fortin et al. | |
| 2004/0025045 | A1 * | 2/2004 | Chan | .............................. 713/200 |
| 2004/0034765 | A1 * | 2/2004 | James | ................................ 713/1 |
| 2007/0288687 | A1 | 12/2007 | Panabaker | |

FOREIGN PATENT DOCUMENTS

KR 2005-0040498 5/2005

OTHER PUBLICATIONS

White Paper, Intel® NAND Flash Memory for Intel® Turbo Memory, 8 pages, Intel Corporation, May 2007.
International Search Report for corresponding matter P25690PCT, mailed Apr. 28, 2009.
Advanced Configuration and Power Interface Specification, Hewlett-Packard Corporation et al., Revision 3.0b, Oct. 10, 2006, cover page, p. ii, pp. 402-415.

\* cited by examiner

*Primary Examiner* — Mark Connolly
(74) *Attorney, Agent, or Firm* — Blakely, Sokoloff, Taylor & Zafman LLP

(57) ABSTRACT

In some embodiments, an apparatus includes processor cores, a smaller non-volatile memory, a larger non-volatile memory to hold an operating system, programs, and data for use by the processor cores. The apparatus also includes volatile memory to act as system memory for the processor cores, and power management logic to control at least some aspects of power management. In response to a power state change command, a system context is stored in the smaller non-volatile memory followed by the volatile memory losing power, and in response to a resume command, the volatile memory receives power and receives at least a portion of the system context from the smaller non-volatile memory. Other embodiments are described.

11 Claims, 7 Drawing Sheets

SYSTEM AND METHOD FOR FAST PLATFORM HIBERNATE AND RESUME

BACKGROUND

1. Technical Field

Embodiments of the invention relate generally to computer platform hibernate and resume.

2. Background Art

Computer systems typically have certain low power states referred to as S-states including S3 and S4. S3 is sometimes referred to as Standby, Sleep, or Suspend to RAM. State S3 is a sleep state in which the operating system (OS) saves its context into physical memory (dynamic random access memory (DRAM)) and puts the system into a suspend state. Open documents and programs (applications) that were used at the time of entering into S3, or at least a portion of the programs are also saved in DRAM during the suspend state. Contents of some chipset registers may also be written to DRAM. The physical memory DRAM is sometimes called main memory or system memory. During this suspend state, all power is removed from the platform hardware with the exception of the DRAM and a small amount of circuitry used to later wake the system. The S3 power state provides a relatively fast suspend and resume (wake) time due to its ability to save and restore OS context and previously used programs and documents from hi-speed DRAM memory.

S4 is sometimes referred to as Hibernate, Safe Sleep, or Suspend to disk. In S4, the OS context and open documents and programs (or a portion thereof) are saved on a hard disk drive (HDD) rather than in fast DRAM memory. This allows for higher power savings than the S3 state because the DRAM is not kept powered. However, there are higher latencies due to slow read and write access times of the HDD. Typical S4 hibernate and resume times are in the order of 10 s of seconds.

While 10 s of seconds may not seem like much time in general, for a user waiting for his or her computer to hibernate or resume from hibernation, it can seem like a long time. Further, while the amount of power needed to keep DRAMs operational is not much for a short amount of time, it can have a significant effect on the charge in a battery over a longer amount of time.

Accordingly, there is a need for circuitry and techniques that provides faster hibernate and resume times than are provided with the S4 power state, and that consumes less power than the S3 power state.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Some embodiments of the invention involve circuitry and techniques for allow a new fast hibernate process in which a system context is written into a non-volatile memory (the smaller non-volatile memory or NVRAM), which has a smaller capacity than another non-volatile memory (the larger non-volatile memory or hard disc drive) that is used to store at least one operating system, programs, and data. In a resume from fast hibernate, the system context is read from the smaller non-volatile memory and used to restore operation of a computer system. In some embodiments, the system context is transferred entirely from DRAM system memory to the smaller non-volatile memory and on resume transferred entirely from the smaller non-volatile memory to the DRAM system memory. In other embodiments, the system context can come partly from other memory such as chipset registers and be written back directly to those registers rather than go indirectly through the DRAM.

In some embodiments, in the fast hibernate process, the transfer from the DRAM system memory to the smaller non-volatile memory occurs even after processor cores and other system components such as a hard drive and display screen are powered down. This allows the user of the computer to a have the perception that the computer system is shut down quickly, even though the transfer of the system context has not been completed. Accordingly, embodiments improve the user perception of the system responsiveness. This gives greater user satisfaction. This is in contrast to the prior art S4 transition in which the processor copies all the context to hard disk drive (HDD) before the host system or partition enters hibernate state and shut downs.

In some embodiments, the fast hibernate process may occur with an operating system (OS) that is designed for S3 and S4 states, but not specifically designed for the fast hibernate process. This may occur by having the BIOS and/or another mechanism respond to a suspend to RAM (S3) command by putting the processor into a system management mode (SMM) and controlling the transfer from the DRAM system memory to the smaller non-volatile memory and then changing a sleep type to hibernate state. In these embodiments, the process may be "transparent" to some OSs.

Figure 1:
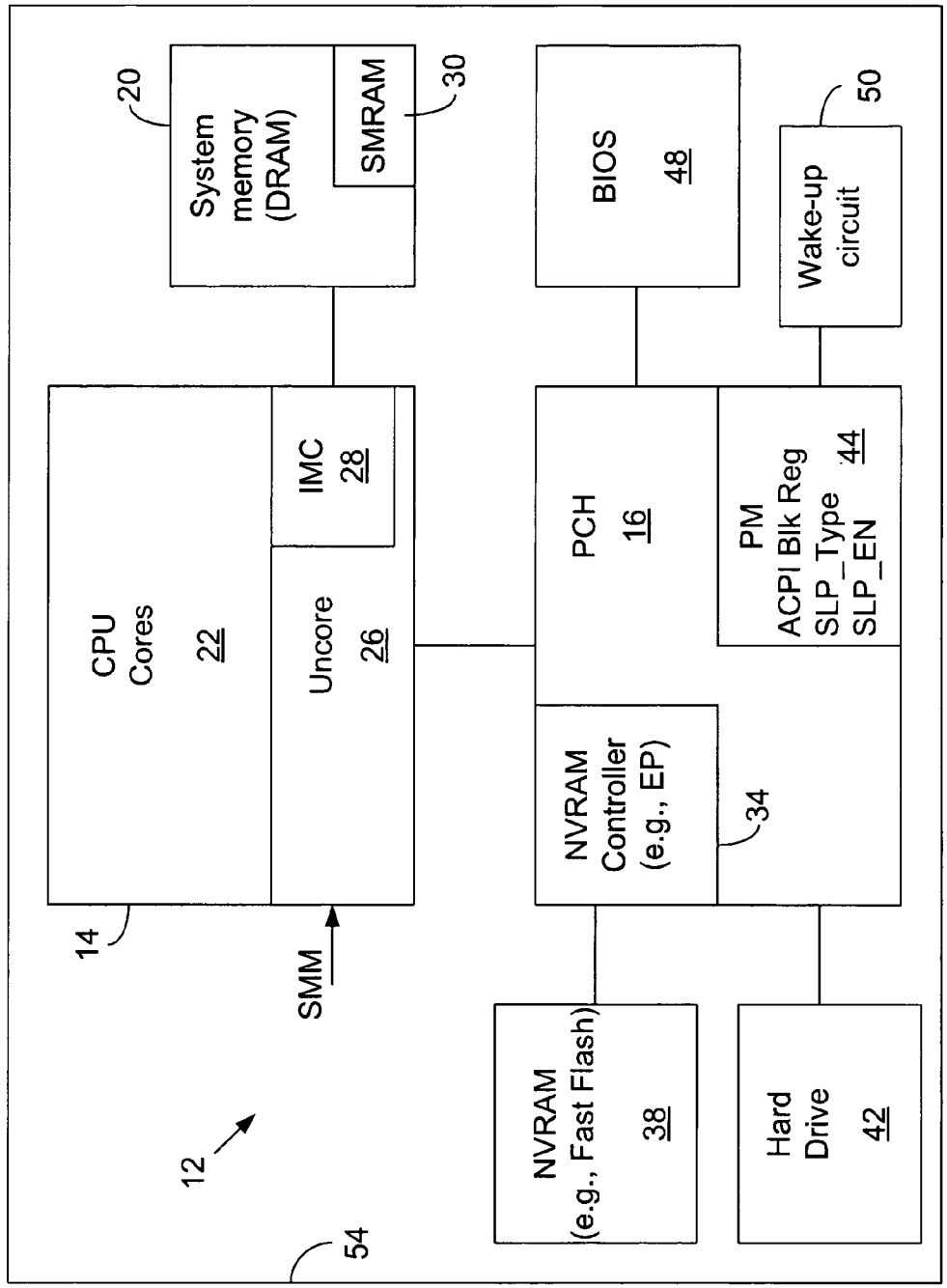
FIG. 1 is a block diagram representation of a computer system according to some embodiments.

Referring to FIG. 1, a system 12 includes a processor 14 coupled to a platform controller hub (PCH) 16 and a system memory (DRAM) 20. Processor 14 includes central processor unit (CPU) cores 22 and an uncore 26. The term uncore is not intended to have a restricted definition, but is a general term to refer to parts of the processor with various interface and control circuits that are not part of the core. Uncore 26 includes an integrated memory controller 28 to control system memory 20. System memory 20 includes a portion 30 for holding instructions for a system management mode (SMM). The SMM may be according to prior art SMM techniques or new SMM techniques or a similar type of mode. A non-volatile memory (NVRAM) 38 is coupled to a PCH 16 through a controller 34. In some embodiments, NVRAM 38 includes Fast Flash and controller 34 is a NAND controller. In some embodiments, controller 34 may be an embedded processor, described below. A hard drive 42 is coupled to PCH 16 and holds an operating system, programs, and data for processor 14. In some embodiments, some of the contents of the hard drive 42 can be used by other components of the system. NVRAM 38 has quite a bit less storage capacity than hard drive 42, but has a quicker access than hard drive 42. Accordingly, NVRAM 38 may be referred to as a smaller a smaller non-volatile memory, and hard drive 42 may be referred to as a larger non-volatile memory. Basic input/output system (BIOS) 48 provides system BIOS instructions. A wake up circuit 50 may be powered during hibernate to allow resume. In some embodiments, the components of the system of FIG. 1 are held in a case 52, such as with a mobile computer.

Figure 2:
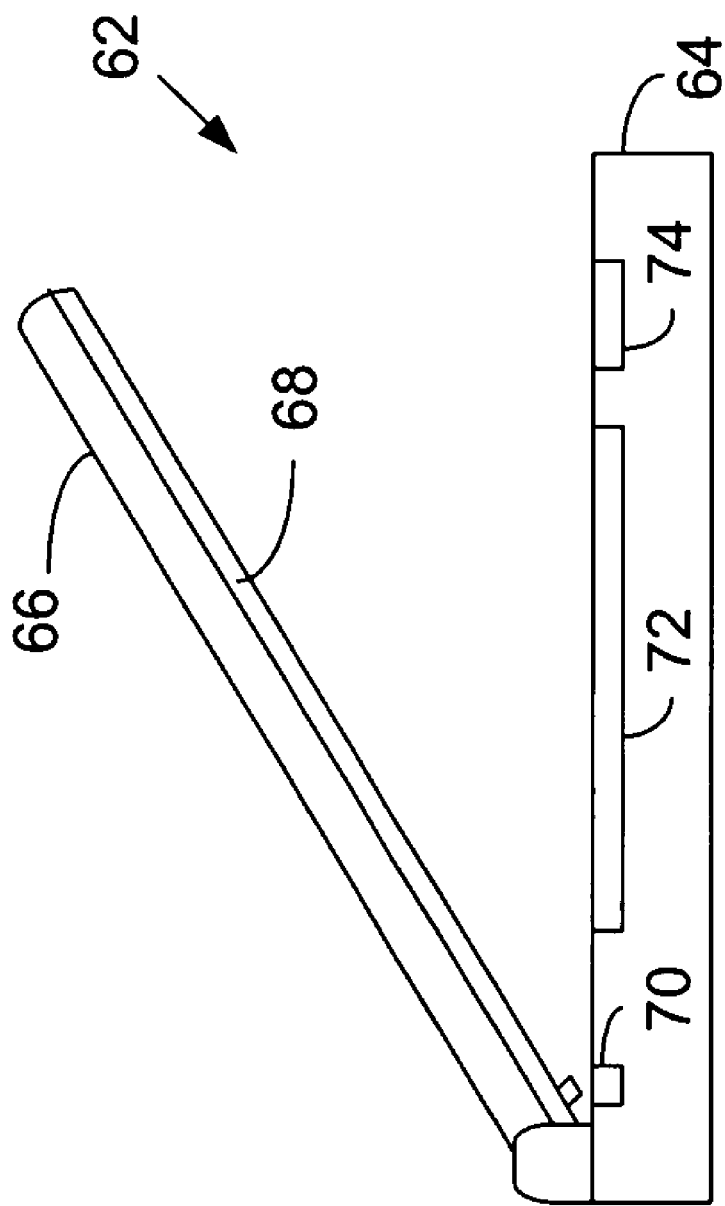
FIG. 2 is a cross-sectional view of a mobile computer according to some embodiments.

FIG. 2 illustrates a mobile computer 62 with a base section 64 and a lid 66 including a display screen 68. Base section 64 includes a system such as in FIG. 1. Base section 64 includes a switch 70 to detect when the lid is opened and closed. Base section 64 also includes buttons 72 (such as for a keyboard or other buttons such as power button) and a cursor control device 94. A power state change command (such as a "standby" command, also called suspend to RAM or S3 command; or fast hibernate command in other embodiments) can be initiated in different ways depending on the embodiments and the configuration of the embodiments. Examples of ways in which a power state change command can be initiated include one or more of the following: closing a lid, pressing a power button, pressing another button, making cursor control clicks of a pull down menu or icon, or other ways. A wake event (resume command) to cause the system to resume from hibernate can be initiated in various ways as well depending on the embodiments and the configuration of the embodiments. Examples of ways in which a resume command can be initiated include one or more of the following: opening a lid, pressing a power button, pressing another button, making cursor control clicks, or other ways. In practice, there may be fewer ways to resume because it is desirable to have the system be essentially totally powered down. In some embodiments, the only way to initiate a resume command is through pressing the power button.

Referring to FIG. 2, a power management unit 44 includes Advanced Configuration & Power Interface (ACPI) block registers, although in other embodiments ACPI registers are not used. Various ACPI specification have been published including a revision 3.0b, dated Oct. 10, 2006, and available for download at www.acpi.info. There are also software ACPI tables held in DRAM. As is known in the prior art, when the computer system is turned on, system BIOS starts to execute. System BIOS can be platform and chipset specific firmware and pass platform and chipset specific information through the APCI tables (in DRAM).

The ACPI registers include a register called sleep type (SLP_TYPE) register and a sleep enable (SLP_EN) register. Assume that a 01 in the sleep type register indicates suspend and a 02 in the sleep type register indicates hibernate. When a user selects suspend, the OS looks up the ACPI table and sees that suspend means that bits 01 are written into sleep type register. The OS programs that value in the sleep type register. When the OS is ready to go into suspend, it sets the sleep enable bit(s). After the OS sets that sleep enable bit, hardware takes over and PCH 16 powers down the platform as described below.

The system can be configured so that when a user selects suspend to RAM (S3), the system actually performs a fast hibernate. Alternatively, fast hibernate may be an express option for the user. The following describes techniques whereby a suspend to RAM (S3) and later resume can be selected, but a fast hibernate and later resume from fast hibernate are performed.

An embedded processor (EP), such as embedded processor 34, could be an existing Manageability Engine (ME) in the chipset or any other processing engine (including high privilege modes of the host CPU) in the platform that has access to physical DRAM and some non-volatile memory such as Flash. EP 34 may run its code from either flash or physical memory and its execution is independent of the processor cores or host platform state. This allows EP 34 to perform out-of-band manageability functions for the platform when the host cores are not executing. Merely having an embedded processor in a chip of a computer system is not new, but it is believed that using an embedded as described herein is new.

NVRAM 38 may maintain its context without any external power. Flash technology is an example of this type of memory and is used almost in all platforms to store platform's boot strap code (BIOS) and configuration data. The size of this memory may depend on the size of platform boot strap code and any other information that may need to be stored while the platform is not powered. EP 34 may also use NVRAM to store its code and data. NVRAM 38 may include flash memory, such as "Fast Flash" according to a currently available technology or according to a Fast Flash available in the future. NVRAM 38 may be used to store data in addition to the system context. With all other things being equal, an NVRAM with faster access times is preferred. In some embodiments, NVRAM 38 has a capacity at least as great as that of DRAM system memory 20, and in some embodiments, much greater that that of the DRAM system memory 20.

Figure 3:
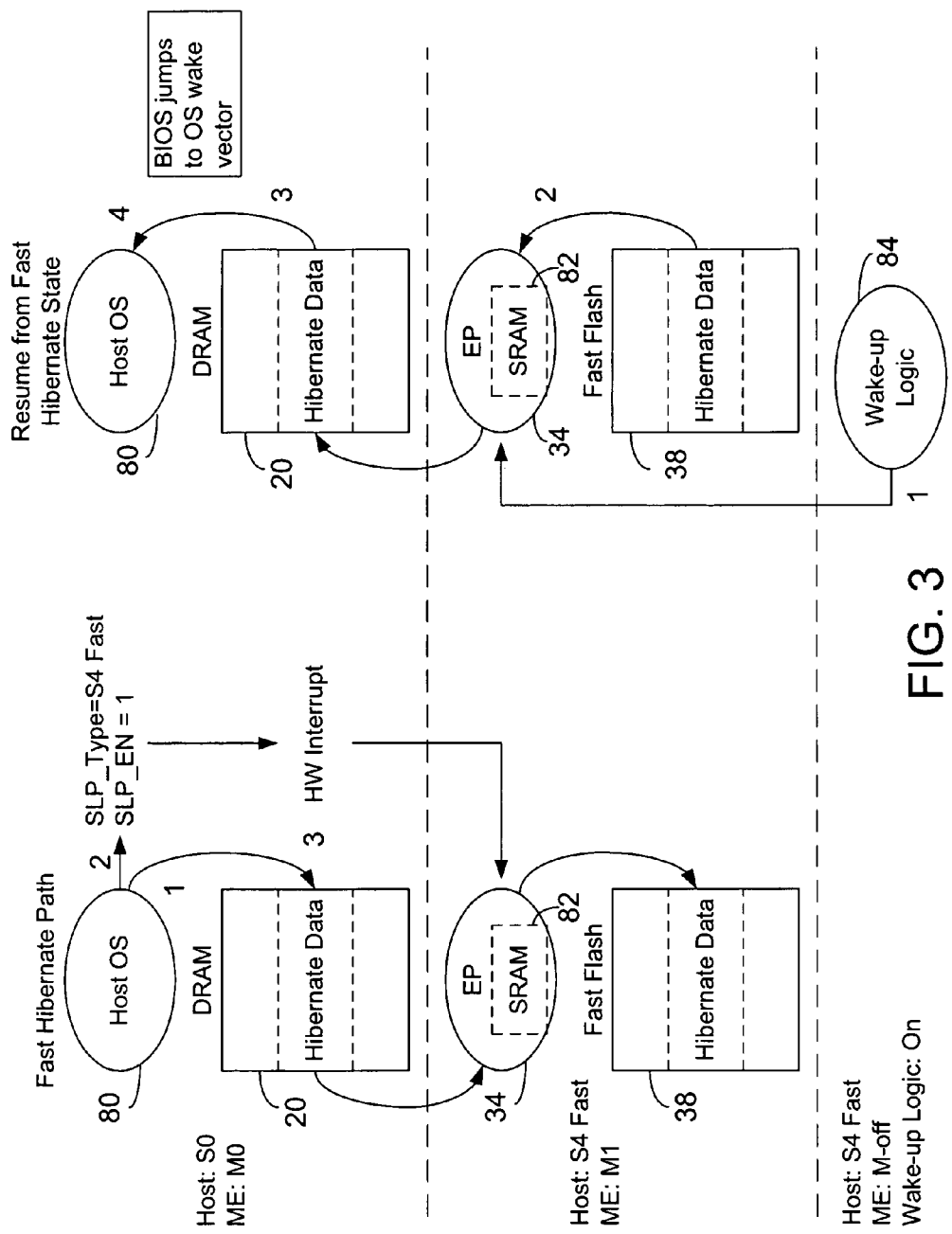
FIG. 3 illustrates flow diagrams of a fast hibernate path and a resume from a fast hibernate state according to some embodiments.

FIG. 3 shows an overview of examples of a fast hibernate path flow diagram and a resume from fast hibernate flow diagram. The details may differ in different embodiments. In the examples of FIG. 2, block 80 represents the host OS. Hibernate data is written to system memory DRAM 20 (some of which may be written before the fast hibernate command and some after). Prior to a fast hibernate command (which may be the same as an S3 command), the platform (host) is in an S0 state and the manageability engine (ME) (which may be or include embedded processor 34) is in a M0 state. The sleep type register is set to S4 fast, which may be the same as for S3 in some systems. When the sleep enable register is set to 1, a hardware interrupt is generated, which causes embedded processor 34 to copy the hibernate data from system memory DRAM 20 to fast flash NVRAM 38. The platform host state is then S4 fast and ME has state M1.

Once the copying is complete, ME has M-off state and wake-up logic 84 is on. Wake-up logic 84 may be or include wake-up circuit 50. There may be various types of wake-up logic. The wake-up circuit 50 may include one or more of a physical power button, a particular button, a cursor control device, a universal serial bus (USB) device, a lid opening detector, or something other else.

Once all the OS hibernate related context has been copied into the Fast NVRAM device, EP puts the system DRAM into power down state and shuts itself down. At this point, only minimal circuit required to wake the system maintains power and the system has fully entered the hibernate state.

In the example of a resume path, when wake-up logic 84 is activated, embedded processor 34 copies the hibernate data from fast flash NVRAM 38 to system memory DRAM 20. The BIOS then jumps to an OS wake vector.

In some embodiments, in response to a power state change command, the OS writes to the sleep type register and sleep enable register. There is a separate policy in the BIOS. The BIOS may have a set up option where a user select that what would be an S3 command starts the fast hibernate process—so when OS wants to suspend to RAM, the platform goes into fast hibernate. In some embodiments, the OS is not aware that a fast hibernate is occurring and recognizes that an S3 change is occurring. In some embodiments, the BIOS facilitates the fast hibernate as follows. A trigger is set such that when the OS writes to the sleep enable bit, control is transferred to the BIOS. (In some embodiments, PCH 16 supports a hardware SMM trigger.) A system management mode (SMM) takes control away from the OS in response to the SMM pin being activated. The SMM may be a prior art SMM or a modified new SMM. In some embodiments, processor 14 includes an SMM pin—which when asserted causes the processor cores to get into a SMM mode. The processor cores halt and jump to the SMRAM section 30 of DRAM 20. SMRAM section 30 is owned by the BIOS, which may install the contents at boot. When SMM is asserted, the CPU takes its instructions from the SMRAM 30. At the end of the SMM instructions, there may be a resume command to return to OS.

In some embodiments, the sleep type register is changed from suspend to RAM S3 to hibernate to DISC S4 (e.g., 01to 02) after the contents of DRAM 20 is transferred to NVRAM 38. After the change in sleep type register, the OS proceeds as if the system were in S3 and the BIOS proceeds as if the system were in hibernate mode, which causes the system to shut down with small exceptions as discussed. This forces the hardware platform to transition to the deeper sleep state S4, but it does not force the OS to copy to the hard drive because the OS thinks the platform is in suspend. Accordingly, the shut down process is much quicker than in the case of prior art S4. The process is even quicker when the transfer of context occurs while and after much of the rest of the system is shutting down.

Some aspects of going into Fast Hibernate for some embodiments are described as follows, but other in other embodiments, the details are different.

1. OS initiates a fast hibernate transition by saving its current state in a fixed contiguous region of DRAM. This hibernate data region includes an OS wake-up vector as well as hardware and software context for restoring the system upon resume.

2. OS sets the SLP_TYPE and SLP_EN bits in the chipset (PCH 16) to indicate to the chipset hardware that it wants to transition to hibernate state.

3. Setting of SLP_EN bit causes a hardware interrupt to EP 34. EP 34 evaluates the interrupt and determines that system wants to go into hibernate sleep state. EP 34 initiates a partial power-down of the platform by shutting down processor cores 22, and all user visible platform hardware; leaving only DRAM 20 powered. Note that this could be alternatively triggered after some amount of delay (e.g., 15 minutes) thus allowing the system to use conventional S3 for short duration sleep intervals, and only trigger the hibernate function after an extended S3 interval (e.g., 15 minutes).

4. EP 34 copies OS hibernate data region from system DRAM 20 into Fast NVRAM memory 38 via its internal SRAM buffer 82 (shown in FIG. 2).

5. EP 34 arms the wake-up logic 84 to allow for wake from sleep state.

6. EP 34 powers down DRAM 20 and puts itself into power-off state.

7. At this point, whole system is powered down with the exception of minimal hardware needed to wake the system.

Upon the occurrence of a wake event (initiation of a resume command), EP 34 powers-on first and immediately initializes DRAM system memory 20 and starts restoring OS DRAM context from fast NVRAM device 38. In some embodiments, this restoring of DRAM occurs even before the processor starts to execute system BIOS code. While the BIOS follows its regular hibernate resume path, EP 34 continues to restore OS context in DRAM 20 and by the time BIOS 48 completes its initialization of processor, chipset, and other platform components, EP 34 has already completed restoring all OS hibernate recovery context in the DRAM. BIOS 48 finishes its execution and passes control to the OS hibernate wake-up vector that was originally embedded within the OS hibernate recovery context in the DRAM and has been restored by the EP along with the rest of the hibernate data. Once getting control, the OS wake-up code immediately starts executing from DRAM 20 and restores remaining OS components using hibernate recovery data in the DRAM. In other embodiments, the details are different.

In some embodiments, in resuming from fast hibernate, the BIOS starts executing and initializing system components including DRAM 20, which is initialized because power was lost. NVRAM 34 is also initialized. Once memory is initialized, at least some of the contents of NVRAM 38 is copied to DRAM 20. A software switch in BIOS is done from hibernate (S4) flow to a suspend (S3) flow. The BIOS then jumps to an S3_wake_vector. At this point, the OS has what it needs to proceed with an OS S3_wake.

In some embodiments, there are additional processing agents to further speed the resume flow by adding compression hardware, or add security functionality by means of adding encryption capabilities.

Some aspects of resuming from Fast Hibernate for some embodiments are described as follows, but in other embodiments, the details are different.

1. A user action causes a wake event; causing EP 34 and processor 14 to wake-up.

2. EP 34 detects that the system is waking-up from a fast hibernate event and therefore it initializes the memory and starts copying OS hibernate recovery context from NVRAM 38 to DRAM memory 20 via its internal SRAM buffer 82.

3. CPU comes out of reset and starts executing system BIOS code. BIOS executes its hibernate resume path and eventually passes control to the OS wake-vector in the DRAM which by now has been restored by EP.

4. At this point, control goes into the OS wake-up vector in the DRAM and OS starts to restore its state using hibernate recovery data in the system memory.

Because read and write access times to NVRAM 38 are much faster than the read and write access times to hard drive 42, the suspend and resume times are much less with embodiments of the invention than with a prior art S4 suspend to DISC and resume.

Embodiments can give a combination of quicker response time to suspend and resume and longer battery life by having almost all the system shut down between hibernate and resume.

Figure 4:
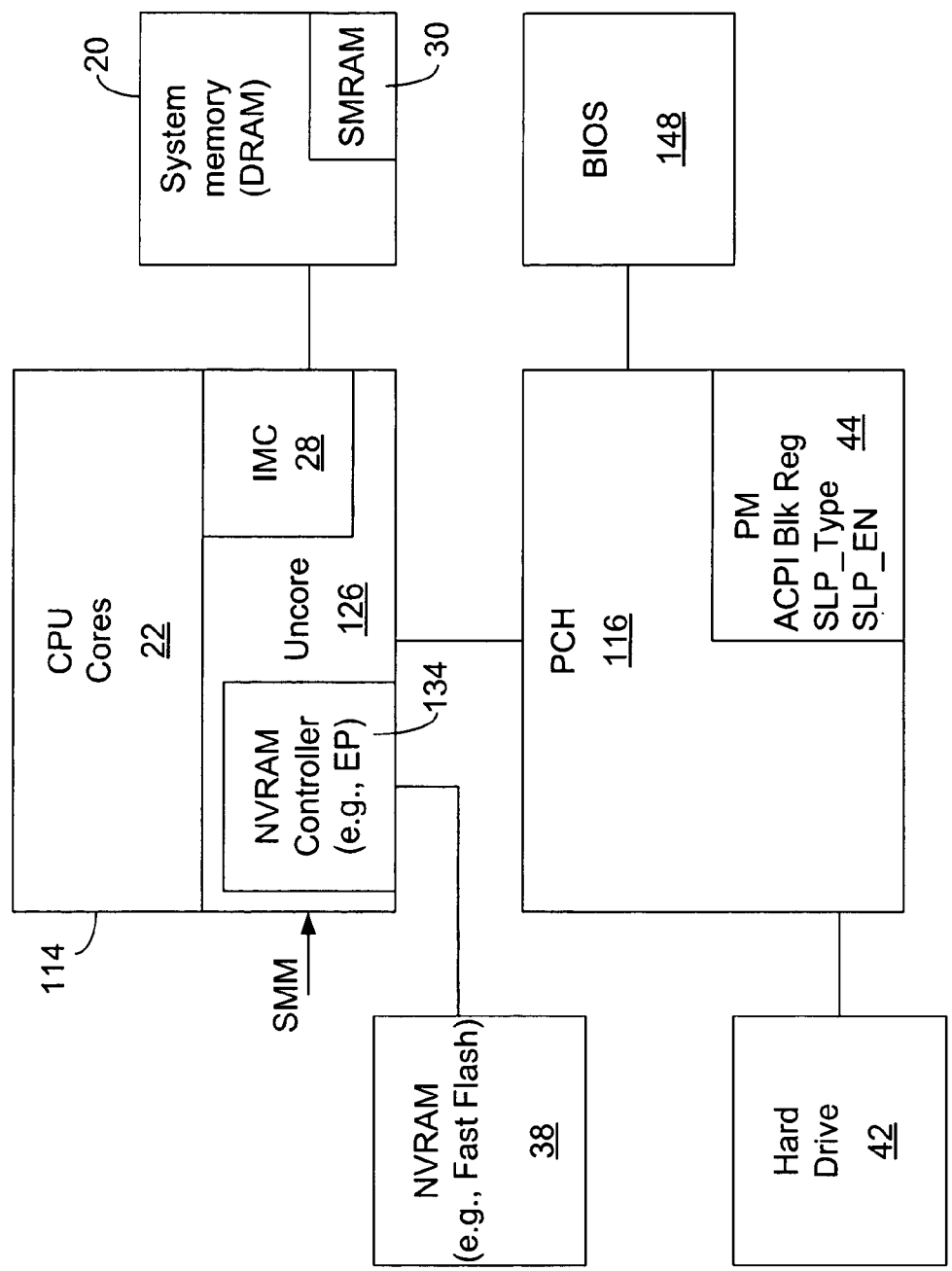
FIGS. 4-7 are each a block diagram representation of a computer system according to some embodiments.

FIG. 4 illustrates a system which is like that of FIG. 1, but in which the NVRAM controller (e.g., embedded processor) 134 is in uncore 126 of processor 114, coupled to PCH 132. BIOS 148 may be the same as or somewhat different than BIOS 48.

Figure 5:
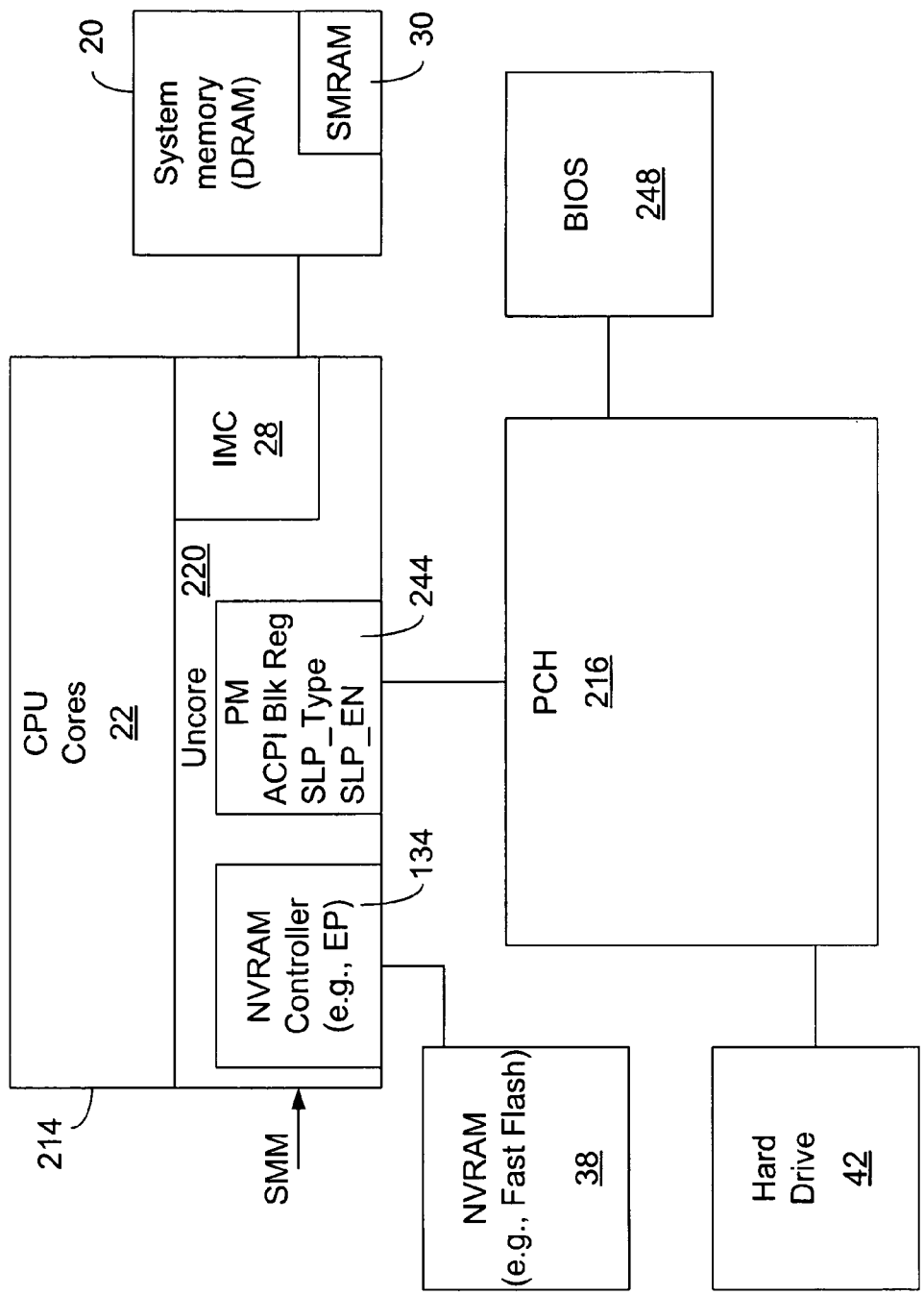

FIG. 5 illustrates a system which is like that of FIG. 4, except that a PM unit 244 is included in uncore 220 of processor 214 rather than in PCH 232. There may be another PM unit in PCH 232. BIOS 248 may be the same as or somewhat different than BIOS 48. Power management logic may be included in a combination of the processor and the PCH, or in merely one or the other.

Figure 6:
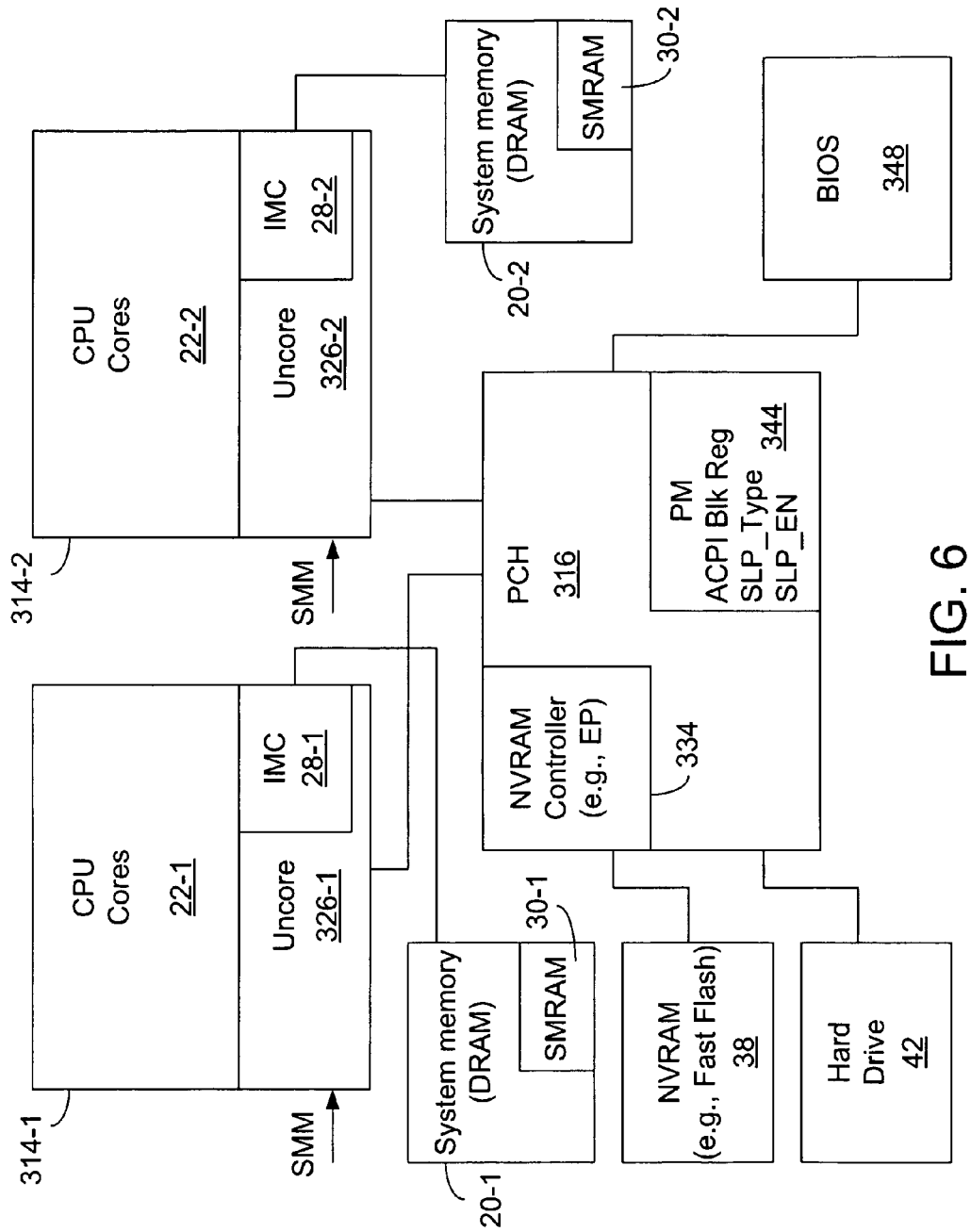

FIG. 6 illustrates a system which is like that of FIG. 1, but in which there are two processors 314-1 and 314-2, including uncores 326-1 and 326-2 with IMCs 28-1 and 28-2 coupled to memories 20-1 and 20-2 (with sections 30-1 and 30-2), respectively as shown. Processors 314-1 and 314-2 are coupled to PCH 316. Processors 314-1 and 314-2, uncores 326-1 and 326-2, controller 334, PM unit 344, BIOS 348 may be the same as or different than processor 14, uncore 20, controller 34, PM unit 44, and BIOS 48.

Figure 7:
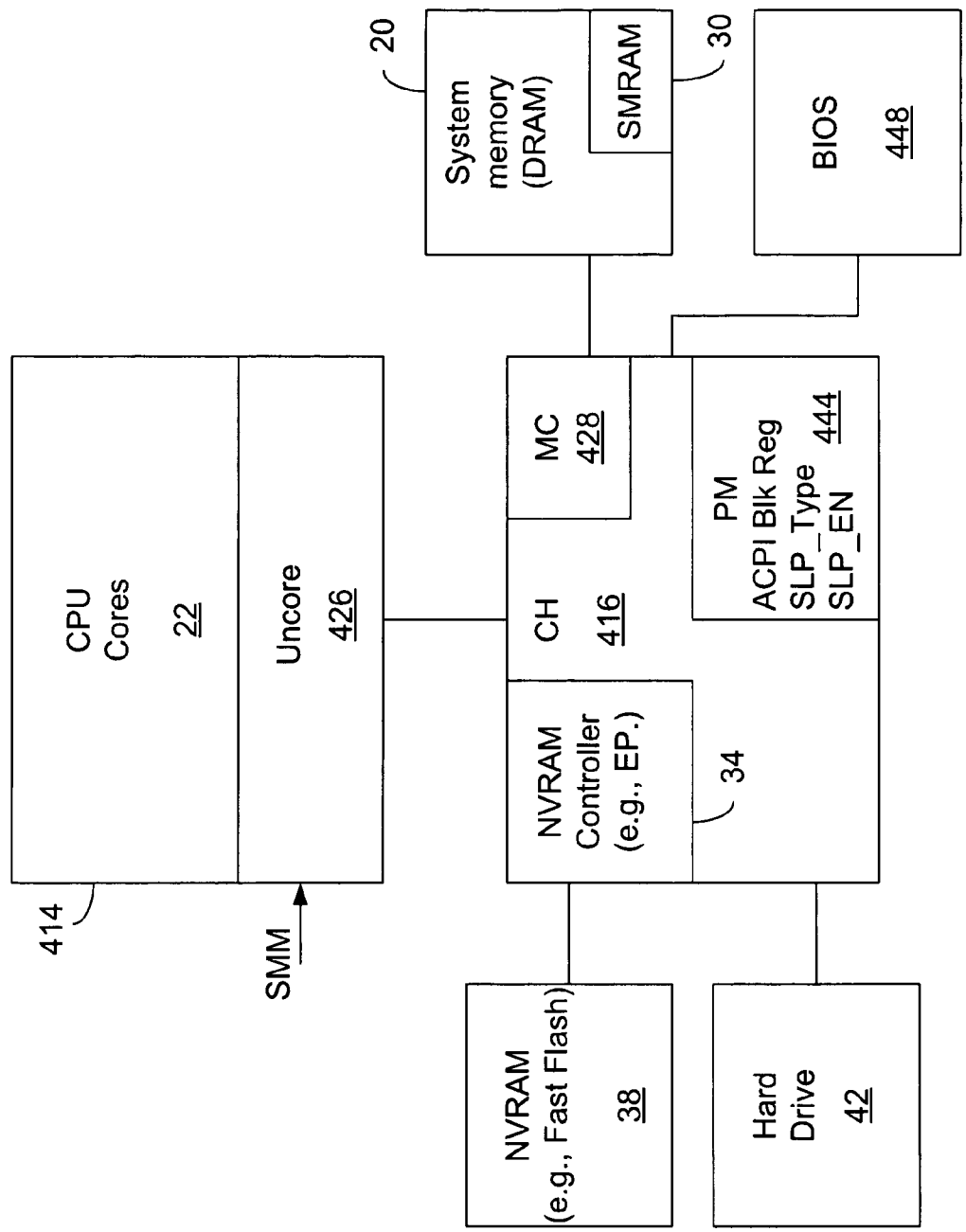

FIG. 7 illustrates a system which is like that of FIG. 1 except that the memory controller 428 is in a controller hub 416 rather than in uncore 416 of processor 414. Memory controller 428, BIOS 444, and power management unit 444 may be the same as or different than memory controller 28, BIOS 48, and power management unit 444.

In the figures, different instances of CPU cores 22, memory controller 28, controller 34, memory 20 and section 30, NVRAM 38, and hard drive 42 may be the same or different than each other.

During some prior art normal S4 resume processes, BIOS can take up to 10-15 seconds to initialize the system before passing control to an OS loader. In some embodiments, in Fast hibernate, the BIOS switches from S4 to S3 path as soon as the DRAM context has been restored (via CPU SMM or EP). This allows for the BIOS to take the faster (for example, a few hundred milliseconds) S3 resume path and quickly jump to an OS wake vector. In other embodiments, the details are different.

The invention is not restricted to use with any particular operating system. Some embodiments may be used with Microsoft Windows, Vista, Mac OSs.

The sleep type register and sleep enable register may be physically separate registers or sub-portions of a larger register.

NVRAM 38 may be all in one physical place or distributed in physically different places.

Additional Information and Embodiments

The "logic" referred to herein can be implemented in circuits, software, microcode, or a combination of them.

The shapes and relative sizes of the blocks in the figures are not intended to show actual shapes and relative sizes. An actual implementation could include additional components and interconnections between components that are not illustrated in the figures.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." Likewise, that A is responsive to B, does not mean it is not also responsive to C.

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. An apparatus comprising:
    processor cores;
    volatile memory to act as system memory for the processor cores;
    a smaller non-volatile memory to hold system context information copied from the volatile memory;
    a larger non-volatile memory to hold an operating system, programs, and data for use by the processor cores;
    power management logic to control at least some aspects of power management; and
    an embedded processor to control transfer of system context data between the volatile memory and the smaller non-volatile memory, the embedded processor being independent of the processor cores and of a platform state of the apparatus;
    wherein, in response to a suspend to volatile memory power state change command, the apparatus causes a system context to be saved by the operating system to a contiguous region of the volatile memory and provides a setting to indicate a hibernate state, wherein the setting causes an interrupt resulting in the embedded processor shutting down the processor cores and copying the system context from the volatile memory to the smaller non-volatile memory, followed by the embedded processor powering down the volatile memory and placing the embedded processor in a power down state; and
    wherein, in response to a resume command, the embedded processor and the processor cores are wakened, the embedded processor initializes the volatile memory and copies at least a portion of the system context from the smaller non-volatile memory to the volatile memory.

2. The apparatus of claim 1, wherein the power management logic operates such that the operating system recognizes the suspend to volatile memory operation, when in fact the system context is stored in the smaller non-volatile memory followed by the volatile memory being power down by the embedded processor.

3. The apparatus of claim 1, wherein the processor cores are powered off before the embedded processor has completed copying the system context from the volatile memory to the smaller non-volatile memory.

4. The apparatus of claim 1, wherein in response to the power state change command, the system initially performs a suspend to volatile memory operation wherein the system context is stored in the volatile memory, and then if there is no activity within a particular amount of time, the system context is stored in the smaller non-volatile memory.

5. The apparatus of claim 4, wherein the processor cores are powered off before completion of storing of the system context in the smaller non-volatile memory.

6. The apparatus of claim 1, further comprising an uncore section of a processor, and wherein the embedded processor copies the system context from the volatile memory to the smaller non-volatile memory through the uncore.

7. The apparatus of claim 6, wherein at least a portion of the power management logic is included in the processor.

8. The apparatus of claim 1, further comprising BIOS, and wherein the BIOS causes the transfer of the system context from the volatile memory to the smaller non-volatile memory and following the copying of the system context from the volatile memory to the smaller non-volatile memory, the BIOS causes a change in a sleep type register from a suspend to volatile memory state to a hibernate state.

9. A method, comprising:
    receiving a suspend to volatile memory power state change command for an apparatus, the apparatus including a volatile memory to act as system memory for processor cores, a smaller non-volatile memory to hold system context information copied from the volatile memory, and a larger non-volatile memory to hold an operating system, programs, and data for use by processor cores;

operating such that the operating system recognizes the suspend to volatile memory operation, when in fact the system context is stored in a non-volatile memory followed by the volatile memory losing power, including:

causing a system context to be saved by the operating system to a contiguous region of the volatile memory, and providing a setting to indicate a hibernate state, wherein the setting causes an interrupt resulting in an embedded processor shutting down the processor cores and copying the system context from the volatile memory to the smaller non-volatile memory, followed by the embedded processor powering down the volatile memory and placing the embedded processor in a power down state; and in response to a resume command, the embedded processor and the processor cores are wakened, and the embedded processor initializes the volatile memory and copies at least a portion of the system context from the smaller non-volatile memory to the volatile memory.

10. The method of claim 9, further comprising powering off the processor cores before completion of storing the system context.

11. The method of claim 9, wherein in response to the suspend to volatile memory power state change command, initially performing a suspend to volatile memory operation wherein the system context is stored in the volatile memory, and then if there is no activity within a particular amount of time, storing the system context in the smaller non-volatile memory.

* * * * *